No. 839,989. PATENTED JAN. 1, 1907.
F. DE COLIGNY.
POWER TRANSMISSION DEVICE.
APPLICATION FILED FEB. 12, 1906.

4 SHEETS—SHEET 1.

Witnesses:
E. E. Gaylord.
John Enders.

Inventor:
Frank de Coligny,
By Dyrenforth, Dyrenforth and Lee,
Attys.

No. 839,989. PATENTED JAN. 1, 1907.
F. DE COLIGNY.
POWER TRANSMISSION DEVICE.
APPLICATION FILED FEB. 12, 1906.

4 SHEETS—SHEET 2.

Witnesses:

Inventor:
Frank de Coligny,
By Dyrenforth, Dyrenforth & Lee
Attys.

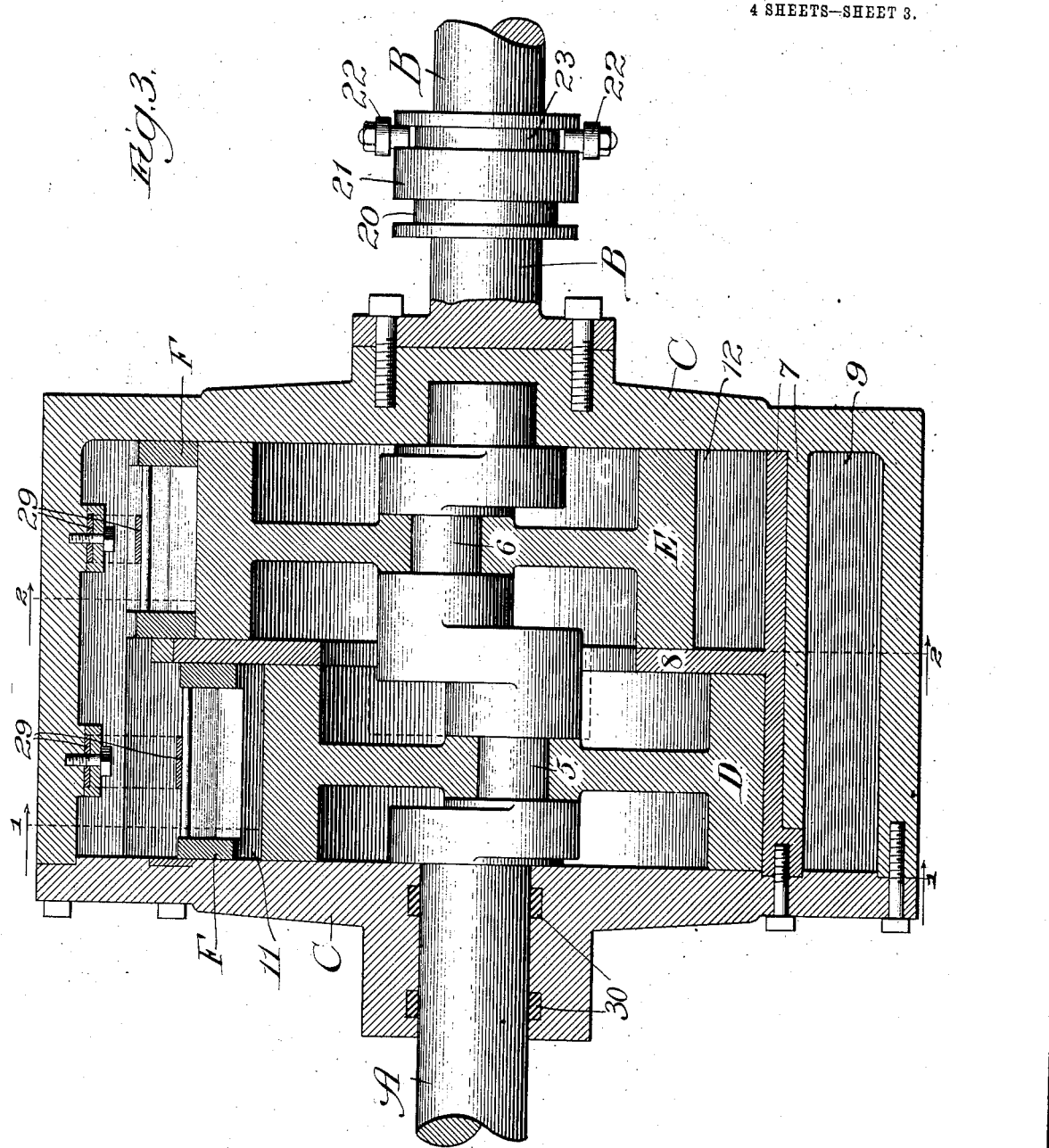

No. 839,989. PATENTED JAN. 1, 1907.
F. DE COLIGNY.
POWER TRANSMISSION DEVICE.
APPLICATION FILED FEB. 12, 1906.
4 SHEETS—SHEET 4.
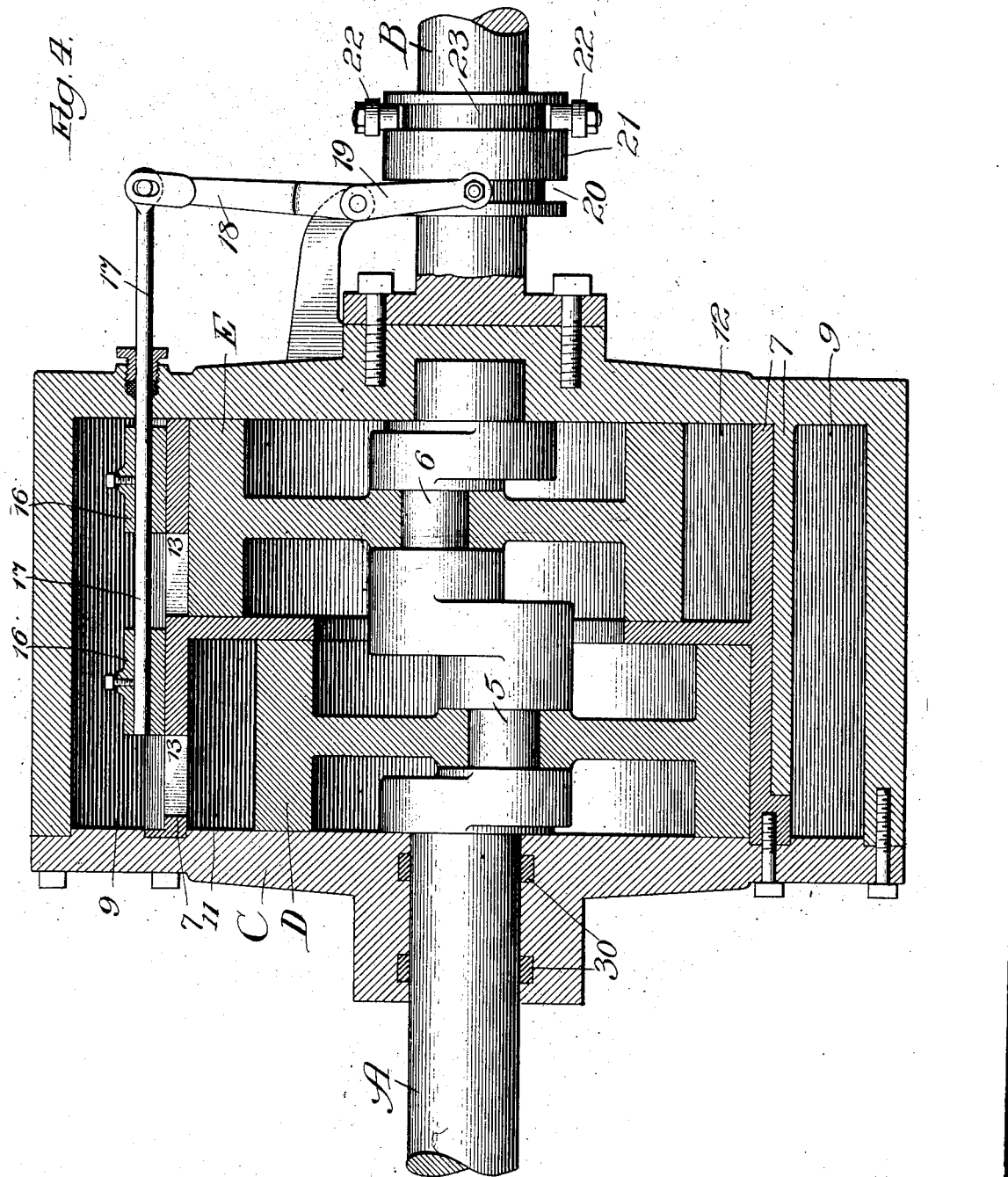
Witnesses:
Inventor:
Frank de Coligny,

UNITED STATES PATENT OFFICE.

FRANK DE COLIGNY, OF CHICAGO, ILLINOIS.

POWER-TRANSMISSION DEVICE.

No. 839,983.

Specification of Letters Patent.

Patented Jan. 1, 1907.

Application filed February 12, 1906. Serial No. 300,714.

*To all whom it may concern:*

Be it known that I, FRANK DE COLIGNY, a citizen of the United States, residing at Chicago, in the county of Cook and State of Illinois, have invented a new and useful Improvement in Power-Transmission Devices, of which the following is a specification.

My invention relates to improvements in power-transmission devices of the general class in which rotary motion between driving and driven parts of power-rotated apparatus may be varied through the medium of a confined body of fluid according to the escape of the fluid from between the two parts.

This invention is in the nature of an improvement upon the power-transmission device shown and described in Letters Patent No. 812,482, which will issue to me February 13, 1906, for improvement in power-transmission devices, my present object being to provide certain changes in the construction whereby the degree of slip of the fluid may be under more perfect control and the parts more evenly balanced, all with a view to adapting the device more perfectly for its purpose.

In carrying out my present invention I provide the device with two coöperating eccentrically-mounted wheels instead of one, as formerly.

Figure 1:
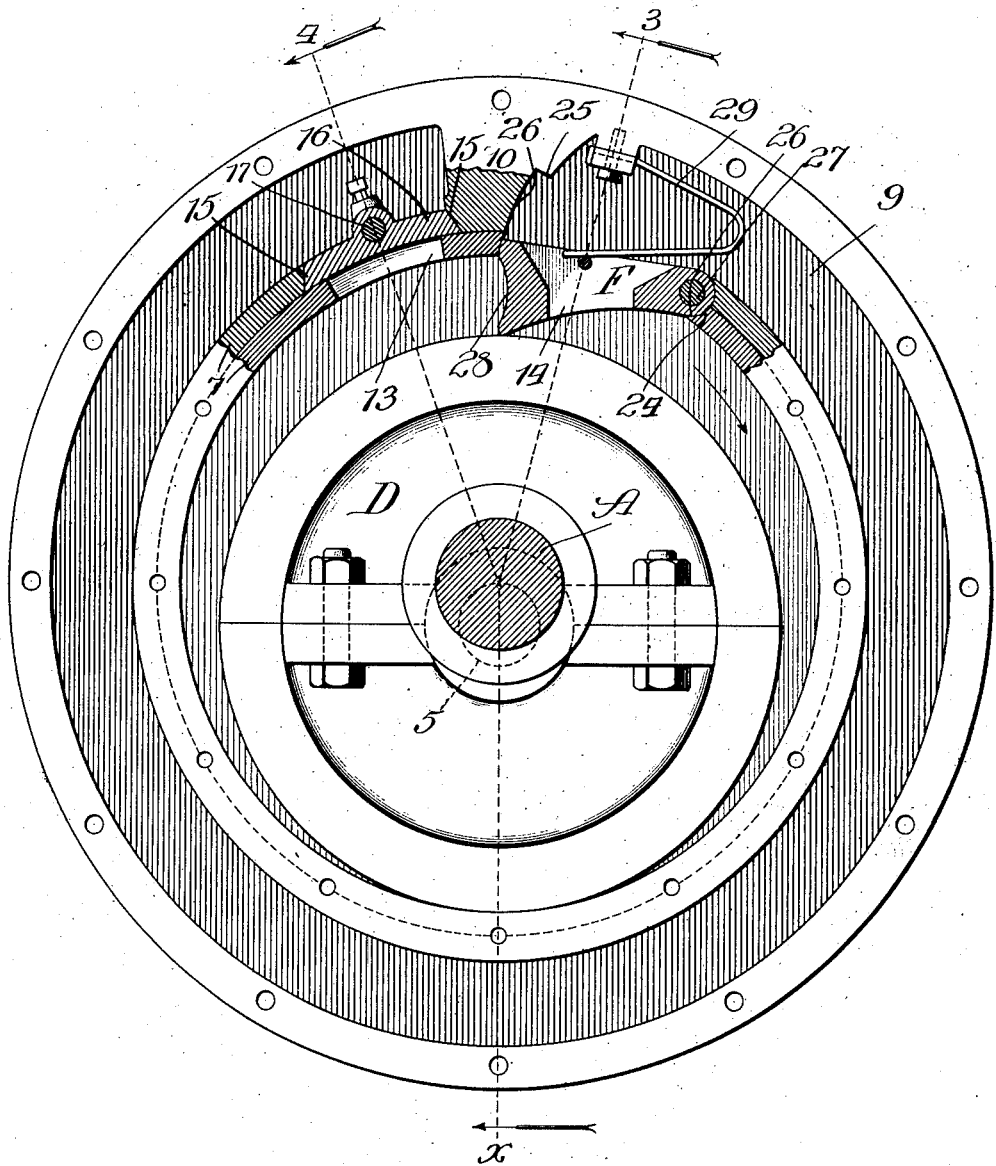
Figure 2:
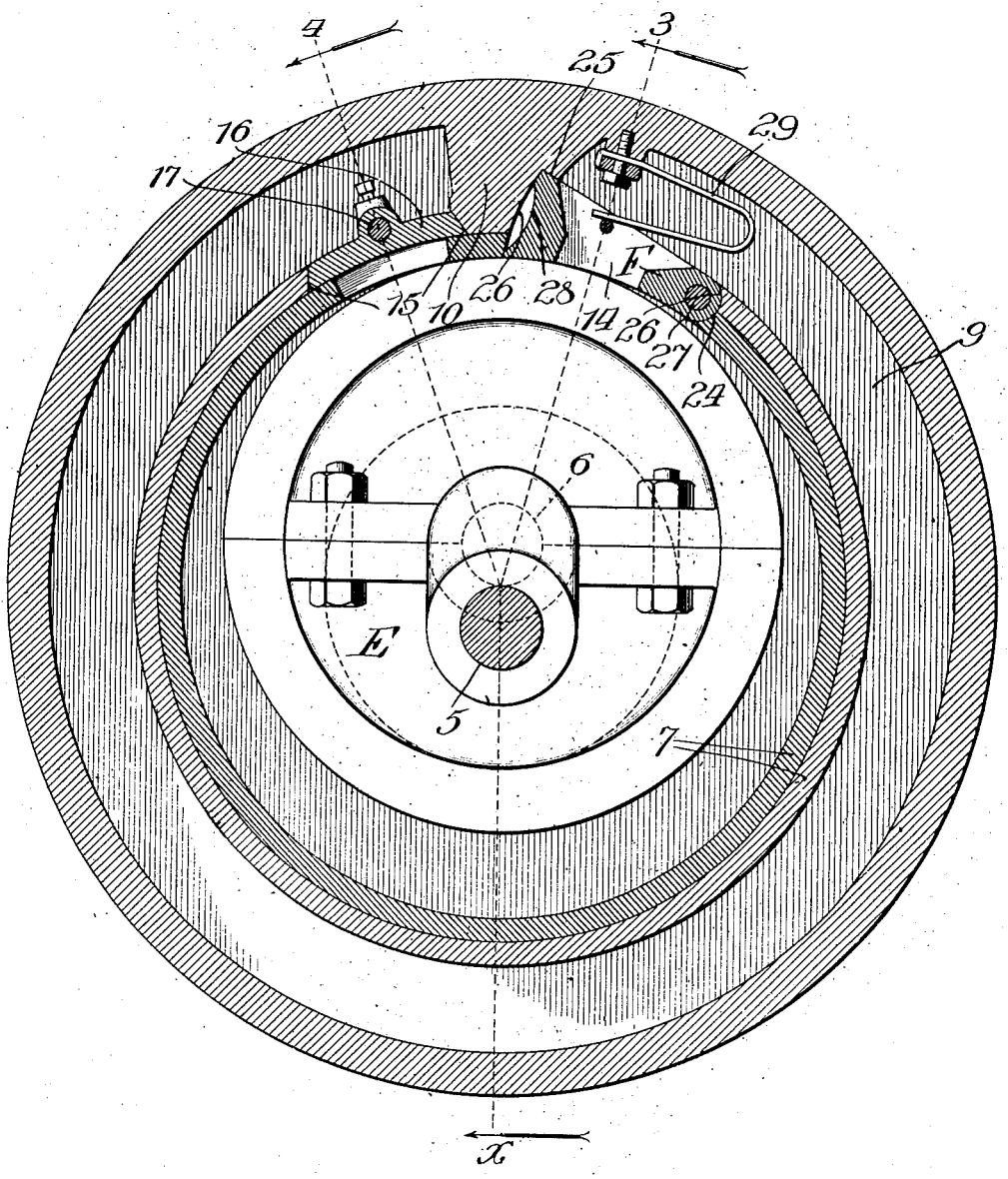

Referring to the accompanying drawings, Figure 1 is a partly broken and sectional side elevation of my improved device, the section being taken on irregular line 1 1 in Fig. 3; Fig. 2, a section on irregular line 2 2 in Fig. 3; and Figs. 3 and 4 sections taken, respectively, on the irregular lines 3× and 4× in Figs. 1 and 2.

The power or driving shaft A is shown in the present instance, for purposes of illustration, as provided with two cranks 5 and 6, though in practice they may be eccentric disks, as illustrated in my former construction. The driven or propeller shaft B carries a cylinder C, having an inner chamber nearly surrounded by a bushing 7, formed midway between its ends with an inward extending rib 8. Around the bushing 7 is a conduit or passage 9, containing a transverse partition 10. The rib 8 forms, in effect, a partition dividing the circumferential portion of the inner chamber into the two annular compartments 11 and 12. At one side of the partition 10 are openings 13, forming ports between the annular chamber 9 and inner compartments 11 and 12, and on the opposite side of the partition 10 are openings 14, also forming ports between the chamber 9 and compartments 11 and 12. The bushing at the openings 13 forms a dovetailed seat 15 for slide-valves 16, the said slide-valves being upon a stem 17, actuated from the arm of a bell-crank lever 18, which has a bifurcated arm 19, engaging a groove 20 in a sliding collar 21 on the shaft B. The sliding collar may be actuated to move longitudinally upon the shaft B and adjust the valves by means of any suitable operating-lever having a bifurcated end 22, engaging the annular groove 23 in the collar 21.

Rotatably mounted upon the crank or eccentric 5 is a wheel D, bearing at its periphery in rolling contact with the annular wall formed by the inner surface of the bushing 7. The rim of the wheel slides at opposite edges in close contact with the opposite annular walls of the compartment 11. Rotatably mounted upon the crank or eccentric 6 is a wheel E, bearing at its periphery in rolling contact against the annular wall formed by the bushing 7 and moving at opposite sides of its rim portion in close contact with the annular side walls of the compartment 12. The wheels D and E are eccentric with relation to the center of rotation of the driving-shaft, one being at an angle of one hundred and eighty degrees in advance of the other, as indicated.

At each opening 14 the bushing is formed with a concave end 24, and the adjacent face of the partition 10 is formed with a shoulder 25 and a segmental face 26. In each opening 14 is a swinging abutment or deflector F, having an opening through it, as indicated. One end of the abutment is convex or rounded, as shown at 26, adjacent to which the abutment is pivotally mounted upon a pin 27, passing through an opening therein. The swinging end portion of each abutment flares, as shown, whereby at its end it corresponds in thickness with the width of the surface 26, and between its inner and outer edges the said end is provided with a concave recess 28. Springs 29, mounted in the chamber or passage 9 adjacent to the partition 10, bear normally upon the outer surfaces of the abutments F to press them at their lower free ends against the peripheral surfaces of the wheels D E, respectively.

Around the shaft A where it passes through the cylinder or shell C are packing-rings 30 or any suitable form of stuffing-box, which serves to render the cylinder oil-tight. The cylinder may be constructed in sections, as shown, or in any other suitable manner which may be found desirable.

In practice the interior of the cylinder, including the passage 9 and inner chamber and compartments 11 and 12, is filled with a practically incompressible fluid, preferably a suitable oil. In the rotation of the shaft A the eccentrics or cranks 5 6 are rotated, causing the wheels D E to roll upon the circumferential surfaces formed by the bushing 7. The direction of movement of the wheels is indicated by the arrow in Fig. 1, and they operate in their movement to force oil entering through the openings in the abutments around the compartments to and through the openings 13 when the valves 16 are open. When the valves 16 are closed, they and the swinging abutments F prevent movement or circulation of the oil, and consequently the turning movement transmitted to the cylinder and shaft B will be the same as that of the shaft A. Opening of the valves 16 causes the oil forced or pumped by the wheels D E to pass into the surrounding passage or conduit 9 to the ports through the swinging abutments and back to the compartments 11 and 12. The adjustment of the valves 16 determines the sizes of the openings 13 and the degree of slip for the oil, whereby the more nearly closed the valves may be the greater speed will be transmitted from the driving to the driven shaft.

Each surface 26 describes an arc of a circle of which the pin 27 is the center, and as the ends of the abutments slide in practically oil-tight contact against the side surfaces and bear in oil-tight contact against the peripheries of the wheels the abutments preclude any material escape of oil past them. Owing to the presence of the oil at all the joints they are well lubricated while being sufficiently tight. Were the inner chamber not filled with oil, there would be a tendency for oil to work its way from the compartments to the inner chamber in the movement of the rims against the side surfaces of the compartments. Such tendency, however, is practically overcome by maintaining the inner chamber filled with oil, as stated.

Although I show the shaft A provided with cranks 5 and 6, I prefer in practice to substitute eccentric disks for the cranks on account of the tendency of the latter to churn the oil in the inner chamber and the resistance thus produced.

What I claim as new, and desire to secure by Letters Patent, is—

1. In a power-transmission device, the combination with the driving and driven parts, of a cylinder on one of said parts having inner annular bearing-surfaces each surrounding an oil-compartment provided with inlet and outlet ports, and an oil-circulating conduit communicating with the ports, a wheel in each compartment, the wheels being eccentrically mounted on the other of said parts to extend at different angles, with relation to its center of rotation and have independent rotation thereon in rolling contact with the respective surrounding surface, a movable abutment between the said inlet and outlet ports of each compartment bearing against the respective wheel, a valve in said conduit, and operating means for the valve.

2. In a power-transmission device, the combination with the driving and driven parts, of a cylinder on one of said parts having inner annular bearing-surfaces each surrounding an oil-compartment provided with inlet and outlet ports, and an oil-circulating conduit communicating with the ports, a wheel in each compartment, the wheels being eccentrically mounted on the other of said parts to extend at different angles with relation to its center of rotation and have independent rotation thereon in rolling contact with the respective surrounding surface, a movable abutment between the inlet and outlet ports of each compartment bearing against the respective wheel, and a valve at each outlet-port with operating means therefor.

3. In a power-transmission device, the combination with the driving and driven parts, of a cylinder on one of said parts having an inner chamber surrounded by annular oil-compartments separated by an annular partition and each surrounded by an annular bearing-surface having inlet and outlet ports, and an oil-circulating conduit communicating with the ports, a wheel in each compartment, the wheels being eccentrically mounted on the other of said parts to extend at different angles with relation to its center of rotation and have independent rotation thereon in rolling contact with the respective surrounding surface, a movable abutment between the inlet and outlet ports of each compartment bearing against the respective wheel, a valve in said conduit, and operating means for the valve.

4. In a power-transmission device, the combination with the driving and driven parts, of a cylinder on one of said parts having an inner bearing-surface surrounding an oil-chamber provided with inlet and outlet ports, and an oil-circulating conduit communicating with the ports, a wheel eccentrically mounted on the other of said parts to have independent rotation thereon in rolling contact with the said surface in the said chamber, a swinging perforated abutment mounted in said inlet-port and bearing against the said wheel, a valve in said conduit, and operating means for the valve.

5. In a power-transmission device of the character described, the combination with an annular wall, a chamber inclosed by said wall, and an eccentric wheel in said chamber in rolling contact with the wall, of a conduit communicating at one end with an outlet-port in said wall and at its opposite end with an inlet-port, said inlet-port having a segmental face at one side, and a perforated abutment pivotally mounted in said opening to swing in contact with said segmental face and bearing against the periphery of said wheel, substantially as set forth.

FRANK DE COLIGNY.

In presence of:—
J. H. LANDES,
W. T. NORTON.